United States Patent Office 3,689,479
Patented Sept. 5, 1972

3,689,479
PROCESS FOR OXIDIZING AN α-HYDROXYL-AMINOLACTAM TO THE CORRESPONDING α-OXIMINOLACTAM
Jan F. Van Peppen, Chester, and David Jerolamon, Morristown, N.J., assignors to Allied Chemical Corporation, New York, N.Y.
No Drawing. Filed July 20, 1970, Ser. No. 56,660
Int. Cl. C07d 41/06
U.S. Cl. 260—239.3 R                                8 Claims

ABSTRACT OF THE DISCLOSURE

α-Hydroxylaminolactam can be oxidized to the corresponding α-oximinolactam by contacting the α-hydroxylaminolactam, dissolved in an inert solvent, with an oxygen-containing gas, such as air, in the presence of ammonia or a volatile amine as a catalyst. α-Oximinolactams are useful as chelating agents and α-oximinocaprolactam is particularly useful as a precursor of lysine.

BACKGROUND OF THE INVENTION

This invention relates to a process for oxidizing an α-hydroxylaminolactam having from 5 to 12 carbon atoms to the corresponding α-oximinolactam.

α-Hydroxylaminolactams having from 5 to 12 carbon atoms are claimed in U.S. Pat. 3,567,711, which describes a method for preparing them by the catalytic hydrogenation of the corresponding α-nitrolactam. The method described in the patent comprises contacting the α-nitrolactam, dissolved in an inert solvent such as ethanol, with hydrogen in the presence of palladium-on-charcoal catalyst. The weight ratio of α-nitrolactam to palladium is preferably 100:1 to 500:1, and the weight percent of palladium on charcoal is preferably 2 to 6 percent. The hydrogen is preferably maintained at a pressure of 15 to 200 p.s.i.g. The hydrogenation is preferably carried out at a temperature of 50 to 70° C. and is normally complete in about 10 to 200 minutes. The α-hydroxylaminolactam product is recovered from the reaction mixture by evaporation after removal of the catalyst by filtration.

It is desirable to convert α-hydroxylamino lactams to the corresponding α-oximinolactams. α-Oximinolactams are useful as chelating agents and α-oximinocaprolactam is particularly useful as a precursor to lysine.

It is known that aliphatic and cycloaliphatic hydroxylamines can be oxidized to the corresponding oximes by contacting the hydroxylamine in solution with an oxygen-containing gas in the presence of a catalyst. Most of the work in this area has been done with cycloaliphatic hydroxylamines, especially cyclohexylhydroxylamine and cyclododecylhydroxylamine, because the corresponding oximes yield lactams upon Beckmann rearrangement. The lactams are used as monomers in the preparation of polyamides. The following patents illustrate the state-of-the-art in this area.

German Pat. 921,624 discloses that cyclohexylhydroxylamine can be oxidized to cyclohexanone oxime by introducing air into a methanol solution of cyclohexylhydroxylamine in the presence of potassium hydroxide as catalyst. The patent states that the potassium hydroxide can be replaced by certain other basic substances, but does not suggest the use of ammonia.

U.S. Pat. 2,829,163 discloses a process for oxidizing cyclohexylhydroxylamine to cyclohexanone oxime by introducing oxygen into an aqueous acidic solution of cyclohexylhydroxylamine in the presence of cupric catalyst dissolved in the solution.

German Pat. 920,127 discloses that cyclohexylhydroxylamine can be oxidized to cyclohexanone oxime with oxygen in the presence of hydrogenating or dehydrogenating catalyst, such as copper powder, Raney nickel or palladium.

We have found that the teachings of the prior art regarding the oxidation of cyclohexylhydroxylamine to cyclohexanone oxime cannot be analogously applied to the oxidation of hydroxylaminolactams to oximinolactams. An acidic solution completely inhibits the oxidation of hydroxylaminolactams and strong bases, such as potassium hydroxide, cause the lactam ring to open.

SUMMARY OF THE INVENTION

α-Hydroxylaminolactams having from 5 to 12 carbon atoms can be oxidized to the corresponding α-oximinolactam by contacting the α-hydroxylaminolactam, dissolved in an inert solvent, with an oxygen-containing gas, such as air, in the presence of a catalyst selected from the group consisting of ammonia and volatile amines. The reaction proceeds according to the following equation, in which hydroxylaminocaprolactam is representative of the hydroxylaminolactams to which this invention is applicable.

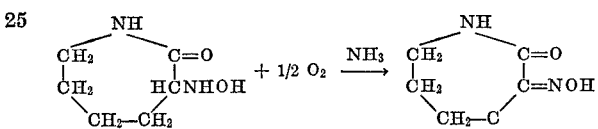

In order to achieve maximum yield, the reaction is carried out until one mol of oxygen has been consumed for every two mols of hydroxylaminolactam initially in solution. A lesser consumption of oxygen results in incomplete conversion of the hydroxylaminolactam and a greater consumption of oxygen produces byproducts.

The reaction proceeds readily at room temperature and at atmospheric pressure. The reaction time decreases with an increase in temperature, but with a sacrifice in yield since greater amounts of other reaction products are obtained at higher temperatures. The preferred temperature range is from 0° C. to 80° C. Subatmospheric and superatmospheric pressures can also be employed if desired.

Ammonia is the preferred catalyst. Volatile amines, such as methylamine and ethylamine, can be substituted for ammonia, but they have no advantage over ammonia, which is cheaper and more readily available. Ammonia and volatile amines are easily removed at the completion of the reaction by evaporation and can be recovered without neutralization. Hence, there is no expense involved in neutralizing the catalyst, and the oxime product can be recovered more easily and without contamination by the catalyst. These particularly advantageous features of the process of this invention are not present in the process reported in the prior art for the oxidation of aliphatic and cycloaliphatic hydroxyl amines.

Even very minor concentrations of ammonia, such as 0.01% by weight based on the weight of the solution, are effective to catalyze the oxidation of α-hydroxylaminolactam to the corresponding oxime. Particularly good results are obtained using a catalyst concentration of 0.1 to 1%. Larger amounts of catalyst can be used, but there is no advantage in doing so.

Any inert solvent can be used. Water and methanol are particularly suitable. Other solvents can be used but they offer no advantages over the use of either of these solvents. The concentration of hydroxylaminolactam in the solution is not critical. For maximum operating efficiency, solutions which approach saturation are preferred.

The following examples further illustrate the invention.

EXAMPLE 1

0.576 gram (0.004 mol) of α-hydroxylaminocaprolactam was dissolved in 20 ml. of 0.1 molar (0.17% by weight) aqueous ammonia. The solution was maintained at 60° C. and was shaken under oxygen. After 100 minutes, 0.0024 mol of oxygen had been consumed. The reaction mixture was then flash evaporated to dryness. The residue was dissolved in 2 ml. of boiling methanol. On cooling, 0.365 gram of α-oximinocaprolactam crystals, melting point 210–212° C., separated. An additional 0.113 gram of α-oximinocaprolactam was recovered from the mother liquor. The total yield was 0.498 gram or 87.7% of theory.

EXAMPLE 2

The procedure of Example 1 was followed except the concentration of α-hydroxylaminocaprolactam in the solution was doubled and the reaction was continued until 0.004 mol of oxygen had been consumed (3 hours). The yield of α-oximinocaprolactam, recovered as in Example 1, was 81.4% of theory.

EXAMPLE 3

The procedure of Example 1 was followed except the concentration of ammonia was doubled and the temperature of the solution was maintained at 20° C. 0.002 mol of oxygen was consumed in 172 minutes. The yield of α-oximinocaprolactam was 97.2% of theory.

EXAMPLE 4

The procedure of Example 3 was followed except oxidation was continued until a total of 0.00288 mol of oxygen had been consumed. The yield of α-oximinocaprolactam was 85.2% of theory.

COMPARATIVE EXAMPLE

The procedure of Example 1 was followed except 0.1 molar aqueous hydrochloric acid was substituted for aqueous ammonia. No oxygen was consumed within 55 minutes.

We claim:
1. A process for oxidizing an α-hydroxylaminolactam having from 5 to 12 carbon atoms to the corresponding α-oximinolactam, which process comprises contacting, at a temperature ranging from about 0° C. to about 80° C., the α-hydroxylaminolactam, dissolved in an inert solvent containing at least 0.01% by weight, based on the weight of the solution, of ammonia or a volatile amine as catalyst, with an oxygen-containing gas until up to about 0.5 mol of oxygen has been consumed for each mol of α-hydroxylaminolactam initially in solution.

2. The process of claim 1 wherein about 0.5 mol of oxygen has been consumed for each mol of α-hydroxylaminolactam initially in solution.

3. The process of claim 1 wherein the inert solvent is water or methanol.

4. The process of claim 1 wherein the catalyst is ammonia.

5. The process of claim 4 wherein the concentration of ammonia is from 0.1 to 1.0% by weight based on the weight of the solution.

6. The process of claim 3 wherein the catalyst is ammonia.

7. The process of claim 6 wherein the concentration of ammonia is from 0.1 to 1.0% by weight based on the weight of the solution.

8. The process of claim 7 wherein about 0.5 mol of oxygen has been consumed for each mol of α-hydroxylaminolactam in solution.

References Cited
UNITED STATES PATENTS 2,938,029  5/1960  Brenner et al. _____ 260—239.3

HENRY R. JILES, Primary Examiner

R. T. BOND, Assistant Examiner

U.S. Cl. X.R.

260—293.86